3,069,438
PROCESS FOR ACYLOXYLATING
20-KETO STEROIDS
Harold Bernard Henbest, Belfast, Northern Ireland, assignor to Glaxo Group Limited, Greenford, Middlesex, England, a British company
No Drawing. Filed Oct. 11, 1960, Ser. No. 61,828
Claims priority, application Great Britain Oct. 13, 1959
9 Claims. (Cl. 260—397.45)

This invention concerns improvements in or relating to the production of vicinal keto acylates in steroids.

Vicinal acetoxylation of keto steroids using lead tetraacetate in acetic acid as the acetoxylating agent has already been proposed, the reaction having been generally carried out at elevated temperatures. It has now been found in accordance with this invention that improved results can be obtained in the acyloxylation of keto steroids using lead tetra-acylates by the presence of Lewis acids or strong acids, particularly the former. In particular, the presence of the Lewis acid or strong acid improves the rate of reaction and can enable lower temperatures of reaction to be employed; thus, in many cases, the reaction proceeds satisfactorily at ambient temperatures, i.e. in the substantial absence of applied heat.

According to the invention, therefore, there is provided an improved process for the vicinal acyloxylation of a keto steroid using a lead tetra-acylate as the acyloxylating agent in which the reaction is effected in the presence of a Lewis acid or a strong acid.

The yield obtained by the process of the present invention is frequently better in relation to a given keto steroid than that obtained at elevated temperature in the absence of a Lewis acid or strong acid catalyst and the fact that the reaction rate is faster and thus lower temperatures can often be used in the present process possesses economic advantages in large scale production. The ability to operate at lower temperatures, in many cases, also means that there may be less likelihood of undesired side reaction taking place with sensitive substituents present elsewhere in the molecule.

Lewis acids are defined as substances which are able to accept a pair of electrons, that is to react with a Lewis base. As used in this specification, the term "Lewis acid" excludes proton-liberating acids such as hydrochloric acid or acetic acid. Examples of Lewis acids include stannic chloride, zinc chloride, and boron trifluoride, the last-mentioned compound being the preferred catalyst in the present process. Boron trifluoride is conveniently used in the form of its etherate. Examples of strong acids include hydrochloric acid, sulphuric acid, perchloric acid and p-toluene sulphonic acid.

The acyloxy group is introduced into the keto steroid in a position adjacent to the keto group. In many keto steroids, for example those having a keto group in the 3- or 20-positions, there are two carbon atoms to which the acyloxy group may be attached and the carbon atom which is acyloxylated in the present process appears to depend on structural considerations. The acyloxy group at a particular carbon atom may, of course, be introduced in the $\alpha$- or the $\beta$-configuration at carbon atoms at which both configurations are available.

As is the case with the known process using lead tetraacetate alone, acyloxylation may not take place due to steric hindrance. The 11-position in the 5$\alpha$-pregnane series is an example of a strongly hindered keto group and acyloxylation may not take place or only take place under forcing conditions. For example, in the acetoxylation of 3$\beta$-acetoxy-5$\alpha$-pregnane 11,20-dione with lead tetraacetate and boron trifluoride, only the 21-acetate appears to be formed when operating at room temperature.

The steroid nucleus to be acyoxylated may, if desired, carry substituents, for example, acyloxy, hydroxy, alkoxy and/or alkyl groups, but preferably does not possess groupings which are capable of reacting with the reagents used unless, of course, the side-reaction products are also of use. Thus, for example, halogen atoms, epoxy groupings, double bonds, etc., may, in some positions, react with the reagents employed.

Compounds which may be used with advantage in the present process are pregnan-20-ones of the 5$\alpha$- or 5$\beta$-series containing, if desired, one or more of the following substituents: a keto, acyloxy or hydroxy group in the 3-position, a keto group in the 11-position, a keto group in the 12-position and a methyl group in the 16-position and/or unsaturation in one or more of the following positions: 1(2), 4(5), 5(6), 9(11) and 16(17). As is well known certain steroids are not inert to Lewis acids or strong acids and care should be exercised in the choice of specific starting materials.

The process according to the invention is preferably carried out in a solvent medium. The best solvent medium for given reactants varies from case to case, as indeed is usually experienced in chemistry and suitable solvents should be selected by experiment. In the acyloxylation of some ring ketones for example it has been found that, using boron trifluoride, hydrocarbon solvents such as benzene are satisfactory. In the case of 20-ketones however it has been noted that undesirable side reactions can occur in some solvents and using boron trifluoride it has been found that best results are obtained by the use of a liquid medium comprising a hydrocarbon solvent such as benzene or toluene containing an alcohol such as methanol or other Lewis base, a mixture of benzene and methanol in the ratio of 19:1 by volume being very satisfactory. It will of course be obvious that the solvents used should not themselves react or inhibit the reagents and for example ketonic solvents are not appropriate.

The process according to the invention is especially suitable for acetoxylation using lead tetraacetate but other lead acylates, e.g. lead tetrapropionate may, of course, be used with formation of the corresponding acyloxyketone.

In order that the invention may be well understood the following examples are given by way of illustration only. Temperatures are given in the examples in degrees centigrade.

EXAMPLE 1

*Acetoxylation of Cholestan-3-One*

(a) USING BORON TRIFLUORIDE-ETHERATE

Boron trifluoride-etherate (2 ml.) was added to a stirred solution of cholestan-3-one (2 g.) and lead tetraacetate (2.6 g., 1.1 moles) in acetic acid (60 ml.) and benzene (10 ml.) at 25°. The mixture was stirred at 25° C. for 9 hours. The end of the reaction was determined by testing a small sample of reaction solution with damp starch-potassium iodide paper. The steroid was isolated with ether and chromatographed on neutralised, deactivated alumina (60 g.). Elution with petrol (B.P. 40–60°) gave unchanged cholestan-3-one (0.337 g.). Elution with petrol (40–60°) benzene (4:1) gave 2$\alpha$-acetoxy-cholestan-3-one (1.22 g.), M.P. 123–124° (recrystallised from acetone-ethanol) $[\alpha]_D$ +57° (in $CHCl_3$).

If the product was chromatographed on more active (alkaline) alumina, the acetate was obtained partly or wholly as 3$\beta$-acetoxy-cholestan-2-one, M.P. 143–144°, $[\alpha]_D$ +76° in $CHCl_3$). Found: C, 78.8; H, 10.9. $C_{29}H_{46}O_3$ requires C, 78.5; H, 10.7%.)

(b) USING PERCHLORIC ACID

Cholestan-3-one (500 mg.) and lead tetraacetate (634 mg.) in acetic acid (23 ml.) containing perchloric acid (1 ml.) was stirred at 25° under nitrogen. After 55 minutes the test for lead tetraacetate was negative and the reaction mixture was poured into water and worked up in the usual way to give a brown solid (569 mg.), which was chromatographed on deactivated alumina (16 g.). Elution with petrol (40–60°) gave cholestan-3-one (138 mg.), M.P. and mixed M.P. 128–129°. Further elution with petrol gave 56 mg. of material which was shown by spectral examination to be a mixture of $\alpha,\beta$-unsaturated ketone and an acetoxylated compound. Continued elution with petrol gave a solid (104 mg.) which crystallized from isopropyl ether to give $2\alpha$-acetoxy-cholestan-3-one, M.P. and mixed M.P. 122–124° and which displayed an infra-red spectrum identical with that of an authentic specimen.

EXAMPLE 2

*Acetoxylation of Cholestan-2-One*

A solution of cholestan-2-one (400 mg.) and lead tetraacetate (505 mg.) in acetic acid (17.78 ml.) containing boron trifluoride etherate (0.66 ml.) was stirred at 25° under nitrogen. After 6 hr. more boron trifluoride etherate (0.88 ml.) was added; all the lead tetraacetate was consumed after a further hour. The usual working up gave a yellow oil (460 mg.) which crystallized from petrol on standing at room temperature to give $3\alpha$-acetoxy-cholestan-2-one (107 mg.), M.P. 145–8°. Recrystallisation from acetone-ethanol gave material M.P. 148–9°, $[\alpha]_D^{17}$ +57° (c., 1.08 in $CHCl_3$) $\lambda_{max.}$ 294 m$\mu$ ($\epsilon$, 42). (Found: C, 78.5; H, 10.70. $C_{29}H_{48}O_3$ requires C, 78.32; H, 10.88%.) Chromatography of the mother liquor on deactivated alumina (22.5 g.) furnished oils by elution with petrol whilst elution with petrol (40–60°)-benzene (9:1) gave more $3\alpha$-acetoxycholestan-2-one (80 mg.) M.P. 146–8° after crystallization from acetone-ethanol.

EXAMLPE 3

*Acetoxylation of $3\beta$-Acetoxy-$5\alpha$-Pregnane-11,20-Dione*

The reaction was carried out between the diketone (1 g.) and lead tetraacetate (1.3 g., 1.1 moles) in acetic acid (20 ml.) at 25° containing boron trifluoride-etherate (5 ml.). After 3 hours the steroid was isolated with ether and chromatographed on deactivated alumina (30 g.). Elution with petrol (40–60°)-benzene (1:1) gave an unknown compound, M.P. 241–242° C., after crystallisation from theanol and from ethyl acetate. Elution with benzene gave $3\beta,21$-diacetoxy-$5\alpha$-pregnane-11,20-dione (0.22 g.), M.P. 145–146°, $[\alpha]_D$ +75° ($CHCl_3$), after crystallisation from ethanol.

EXAMPLE 4

*Snythesis of $3\beta$-Diacetoxy-$5\alpha$-Pregnane-11,20-Dione From $3\beta$-Acetoxy-$5\alpha$-Pregnane-11,20-Dione*

$3\beta$-acetoxy-$5\alpha$-pregnane-11,20-dione (500 mg.) and lead tetraacetate (650 mg., 1.1 moles) in a mixture of dry benzene (19 ml.) and dry methanol (1 ml.) containing boron trifluoride etherate (2.5 ml.) was stirred at 25° for 4 hours. The reaction mixture was then poured into water and processed in the usual manner to give an almost colourless gum. The crude product was dissolved in benzene (5 ml.) and petrol (20 ml., B.P. 40–60°) was added whereupon crystallisation occurred to give $3\beta,21$-diacetoxy-$5\alpha$-pregnane-11,20-dione (497 mg.; 86%), M.P. and mixed M.P. 144–145°; infrared spectrum identical with that of an authenic sample.

EXAMPLE 5

*$3\alpha,21$-Diacetoxy-$5\beta$-Pregnane-11,20-Dione*

$3\alpha$-acetoxy-$5\beta$-pregnane-11,20-dione, M.P. 131–132.5°, (0.498 g., 1.33 m. mole) and freshly crystallised lead tetraacetate (0.652 g., 1.1 equiv.) in dry benzene (19 ml.) and dry methanol (1 ml.) was treated with boron trifluoride etherate (2.5 ml.). The reaction was magnetically stirred for 4 hrs. at 23° in a sealed flask, poured into excess water, and the product isolated with chloroform. The chloroform extract was washed with aqueous sodium hydrogen carbonate solution, and dried over sodium sulphate. Removal of the chloroform gave a froth (0.579 g.). Side chain assay 71%. The crude froth (0.50 g.) crystallised from ethyl acetate/40–60° petrol to give $3\alpha,21$-diacetoxy-$5\beta$-pregnane-11,20-dione (0.271 g.) as prisms, M.P. 106–109°, $[\alpha]_D^{21}$ +124.7° (c., 1.0 in $CHCl_3$), side chain assay (TPTZ) 99%.

A larger scale experiment starting with $3\alpha$-acetoxy-$5\beta$-pregnane-11,20-dione M.P. 131–134° (9.96 g., 26.6 m. mole) gave a crude product (11.57 g.) which on crystallisation gave 7.21 g., M.P. 103–111°. A further crystallisation from ethyl acetate/petrol (B.P. 40–60°) gave 6.09 g. of the 21-acetoxy derivative, M.P. 106–111°, $[\alpha]_D^{21}$ +125.1° (c., 0.931 in $CHCl_3$).

EXAMPLE 6

*21-Acetoxy-$3\alpha$-Hydroxy-$5\beta$-Pregnane-11,20-Dione*

$3\alpha$-hydroxy-$5\beta$-pregnane-11,20-dione (8.77 g.) in a mixture of dry benzene (370 ml.) and dry methanol (20 ml.) was treated with lead tetraacetate (13.34 g., 1.14 equiv.) and then boron trifluoride etherate (50 ml.). The reaction mixture was magnetically stirred for 4 hr. at 23° in a sealed flask, the solution shaken with water, and the aqueous layer was extracted with benzene. The benzene extract was washed successively with water, aqueous sodium hydrogen carbonate, and aqueous sodium chloride, and dried over sodium sulphate. Removal of the solvent from the extract in vacuo left a residue (11.5 g.) which on crystallisation from ethyl acetate/60–80° petrol gave the 21-acetoxy-compound (6.72 g., 65.5%), M.P. 135–138°. A second crop, after repeated crystallisation, gave a further quantity (0.54 g.), M.P. 137–139°, bringing the total yield to 70.6%. Further crystallisation gave an analytical sample, M.P. 137.5–139.5°. (Found: C, 71.0; H, 8.9. Calc. for $C_{23}H_{34}O_5$: C, 70.7; H, 8.8%.)

Similar experiments were carried out using stannic chloride, zinc chloride, P-toluene sulphonic acid and sulphuric acid respectively in place of boron trifluoride etherate, and the desired end-product was obtained in each case as evidenced by side chain assays and paper chromatography.

EXAMPLE 7

*21-Acetoxy-$5\alpha$-Pregnane-11,20-Dione*

$5\alpha$-pregnane-11,20-dione M.P. 136–138° (2.186 g., 6.95 m. mole) and freshly dried lead tetraacetate (3.3 g., 1.1 equiv.) in dry benzene (95 ml.) and dry methanol (5 ml.), was treated with boron trifluoride etherate (12.7 ml.). The reaction was magnetically stirred for 4 hr. at room temperature in a stoppered flask, poured into excess water and the product taken into benzene. The benzene extract was washed successively with water, sodium hydrogen carbonate solution and saline, and dried over sodium sulphate. Removal of the benzene gave material (2.5 g., 96.5%) M.P. 151–156°, side chain assay 76.6%. Crystallisation from ethyl acetate/60–80° petrol gave 21-acetoxy-$5\alpha$-pregnane-11,20-dione (1.52 g., 58.6%), M.P. 158–161°. A further crystallisation from the same solvent mixture gave material M.P. 161.5–163.5°, $[\alpha]_D$ +110.8° (c., 1.12 in $CHCl_3$). (Found: C, 73.4; H, 9.1. $C_{23}H_{34}O_4$ requires C, 73.8; H, 9.15%.)

EXAMPLE 8

*21-Acetoxy-$3\alpha$-Hydroxy-$5\beta$-Pregnan-20-One*

$3\alpha$-hydroxy-$5\beta$-pregnan-20-one (3.18 g., 10 m. mole) and freshly dried lead tetraacetate (4.65 g., 1.05 equiv.) in dry benzene (127 ml.) and dry methanol (6.5 ml.), was treated with boron trifluoride etherate (18.6 ml.). The reaction was stirred magnetically for 4 hr. at room temperature in a stoppered flask, poured into excess water, and the product isolated with benzene, which was washed successively with water, sodium hydrogen carbonates solution, and saline. After drying over sodium sulphate, removal of the benzene gave a solid (3.57 g.), side chain assay 64.6%. Crystallisation from methyl acetate/60–80° petrol gave 21-acetoxy-3α-hydroxy-5β-pregnan-20-one (2.4 g., 63.7%), M.P. 167–171°. Further crystallisation gave material M.P. 173–176° $[\alpha]_D$ +108.9° (c., 0.620 in $CHCl_3$). (Found: C, 73.2; H, 9.8. $C_{23}H_{36}O_4$ requires C, 73.4; H, 9.6%.)

EXAMPLE 9

*3β-Hydroxy-21-Acetoxy-Pregn-5-En-20-One*

3β-hydroxy-pregn-5-en-20-one M.P. 193° (0.841 g., 2.66 m. mole) and lead tetraacetate (freshly prepared, 1.304 g., 1.1 equiv.) in sodium-dry benzene (38 ml.) and dry methanol (2 ml.) was treated with re-distilled boron trifluoride etherate (5 ml.). The reaction mixture was magnetically stirred for 4 hours at room temperature in a sealed flask. A fine precipitate separated and the mixture was then poured into excess water and the organic phase separated. The aqueous phase was extracted with benzene (2 x 10 ml.) and the combined organic phases washed with sodium hydrogen carbonate (2 x 10 ml.) and water (1 x 10 ml.), dried ($Na_2SO_4$) and evaporated to dryness to give a white crystalline solid (837 mg., 84%) M.P. 162–171°. The infrared spectrum was similar to that of an authentic sample. The material gave a positive TPTZ test and side chain assay 80%. Two recrystallisations from ethyl acetate gave 425 mg. (43%), M.P. 177.5–181°, $[\alpha]_D$ +35.2° (c., 1.42 in $CHCl_3$). (Found: C, 73.5; H, 9.2, Calc. for $C_{23}H_{34}O_4$, C, 73.8; H, 9.1%.)

EXAMPLE 10

*21-Acetoxy-Pregn-4-Ene-3,20-Dione*

Progesterone, M.P. 128–131° (0.418 g., 1.33 m. mole) and freshly prepared lead tetraacetate (0.652 g., 1.1 equiv.) and sodium-dry benzene (19 ml.) and dry methanol (1 ml.) was treated with re-distilled boron trifluoride etherate (2.5 ml.). The mixture, which was magnetically stirred for 4 hr. at room temperature in a sealed flask, acquired a green fluorescence which gradually increased in intensity during the reaction. The mixture was then poured into excess water and the organic phase was separated. The aqueous phase was extracted with benzene (2.5 ml.) and the combined extracts were washed with aqueous sodium hydrogen carbonate (2 x 5 ml.) and water (1 x 10 ml.), dried ($Na_2SO_4$) and concentrated to give a yellow gum (490 mg.) which crystallised from ethyl acetate/petrol (B.P. 40–60°) (12 days at 5°) to give 82 mg., (17%), M.P. 138–150°. The infrared spectrum showed the material to be a crude sample of 21-acetoxypregn-4-ene-3,20-dione. The material, which gave a positive TPTZ test, was recrystallised from ethyl acetate/petrol (B.P. 40–60°) and gave 56 mg., M.P. 153–157°, λ max. 239.5 mμ.

($E^{1\%}_{1cm.}$ 432)

EXAMPLE 11

*3β,21-Diacetoxy-16-Methyl-5α-Pregna-9(11,16) Dien-20-One*

3β-acetoxy-16-methyl-5α-pregna-9(11),16-diene-20-one (500 mg.), methanol (1 ml.) and boron trifluoride etherate (2.5 ml.) were added to freshly crystallised lead tetra acetate (660 mg.) in benzene (sodium dried; 20 ml.).

The mixture was stirred at room temperature for 4 hours and then diluted with water and extracted with ether. The extract was washed with aqueous sodium bicarbonate and water and the solvent was evaporated to give a mixture of buff-coloured crystals and a little oil. This was chromatographed on magnesium trisilicate (7 g.); benzene-petrol (1:1) and benzene eluted unchanged starting material; benzene containing 10% ether eluted a material (37 mg.) M.P. 118–127°, identified by infrared spectrum as 3β,21 - diacetoxy-16-methyl-5α-pregna-9(11),16-dien-20-one.

As evidence of the superiority of the process according to the invention compared with the prior process referred to above there may be cited:

(*a*) Progesterone by the prior process gives deoxycorticosterone acetate in 3% yield (Reichstein and Montigel, Helv. Chim. Acta, 1939, 1212); a 17% yield has been obtained by the present process.

(*b*) Acetoxylation of 3α-hydroxypregnane-11,20-dione at C(21) has given a 13% yield (based on unrecovered starting material) by the prior process (Von Eun, Lardon and Reichstein, Helv. Chim. Acta, 1944, 27, 12871) and a 71% yield by the present process.

A further specific advantage of the present process is that 3β-hydroxypregn-5-en-20-one was converted into its 21-acetoxy derivative without simultaneous acetylation of the 3-hydroxy group whereas, according to Giral (J.A.C.S., 1950, 72, 1913) the prior process gives the diacetate.

I claim:

1. In a process for the acyloxylation in the 21-position of a 20-keto steroid wherein a lead tetra-acylate derived from a straight chain alkanoic acid is used as the acyloxylating agent, the step of carrying out said acyloxylation in the presence of boron trifluoride in a solvent medium comprising a mixture of a hydrocarbon and a lower alkanol.

2. A process as claimed in claim 1 in which said acyloxylation is effected at ambient temperature.

3. A process as claimed in claim 1 in which the lead tetra-acylate is lead tetraacetate.

4. A process as claimed in claim 1 in which said acid is boron trifluoride in the form of its etherate.

5. A process as claimed in claim 1 in which said solvent medium comprises a mixture of benzene and methanol.

6. A process as claimed in claim 1 in which said mixture of benzene and methanol is in the ratio of approximately 19:1 by volume.

7. A process as claimed in claim 1 in which said 20-keto steroid is a member of the pregnane series.

8. A process as claimed in claim 7 in which said 20-keto steroid contains at least one substituent selected from the group consisting of 3-keto, 3-acyloxy, 3-hydroxy, 11-keto, 12-keto and 16-methyl.

9. A process as claimed in claim 8 in which said 20-keto steroid is unsaturated in at least one position selected from the group consisting of 1(2), 4(5), 5(6), 9(11) and 16(17).

References Cited in the file of this patent

UNITED STATES PATENTS

| | | |
|---|---|---|
| 2,230,772 | Bockmuhl et al. | Feb. 4, 1941 |
| 2,230,773 | Bockmuhl et al. | Feb. 4, 1941 |
| 2,440,874 | Reichstein | July 27, 1943 |